US011887434B2

(12) United States Patent
Berman et al.

(10) Patent No.: US 11,887,434 B2
(45) Date of Patent: Jan. 30, 2024

(54) INCREMENTING FEATURE IN GAMING DEVICE

(71) Applicant: KING SHOW GAMES, INC., Minnetonka, MN (US)

(72) Inventors: Bradley Berman, Minnetonka, MN (US); Jacob Lamb, Maple Grove, MN (US)

(*) Notice: Subject to any disclaimer, the term of this patent is extended or adjusted under 35 U.S.C. 154(b) by 0 days.

(21) Appl. No.: 14/927,447

(22) Filed: Oct. 29, 2015

(65) Prior Publication Data
US 2016/0125693 A1    May 5, 2016

Related U.S. Application Data

(60) Provisional application No. 62/072,168, filed on Oct. 29, 2014.

(51) Int. Cl.
| *G07F 17/00* | (2006.01) |
| *G07F 17/32* | (2006.01) |
| *G06F 3/04817* | (2022.01) |
| *G07F 17/34* | (2006.01) |

(52) U.S. Cl.
CPC ...... *G07F 17/3244* (2013.01); *G06F 3/04817* (2013.01); *G07F 17/3267* (2013.01); *G07F 17/34* (2013.01)

(58) Field of Classification Search
CPC ... G07F 17/3267; G07F 17/24; G06F 3/04817
See application file for complete search history.

(56) References Cited

U.S. PATENT DOCUMENTS

| 6,089,977 A | 7/2000 | Bennett |
| 6,517,432 B1 | 2/2003 | Jaffe |
| 6,551,187 B1 | 4/2003 | Jaffe |
| 7,445,548 B1* | 11/2008 | Muskin .................. G07F 17/34 463/20 |
| 7,758,414 B1* | 7/2010 | Marks ................. G07F 17/3211 273/138.1 |
| 8,105,145 B2 | 1/2012 | Jaffe |
| 8,137,179 B2 | 3/2012 | Jensen et al. |
| 8,540,565 B2 | 9/2013 | Burghard et al. |
| 2003/0013517 A1* | 1/2003 | Bennett ............... G07F 17/3267 463/25 |
| 2005/0070354 A1* | 3/2005 | Baerlocher ......... G07F 17/3244 463/20 |

(Continued)

OTHER PUBLICATIONS

IGT, "My Choice—Glorious King", Scanned Brochure, pp. 9-10, 2016.
IGT, "Wild Witch", Scanned Brochure, 2015.

*Primary Examiner* — James S. McClellan
*Assistant Examiner* — Jeffrey K Wong

(57) ABSTRACT

Embodiments of the present invention set forth systems, apparatuses and methods for implementing an incrementing feature in gaming devices. Accordingly, a gaming device can be configured to generate a game outcome in response a wager and determine if an incrementing symbol is present on a game grid when the generated game outcome is shown on a display of the gaming device. When the incrementing symbol is present, a processor is further operable to increment the incrementing symbol while maintaining at least the initial position of the incrementing symbol in the game grid during a subsequent game event.

18 Claims, 14 Drawing Sheets

(56) References Cited

U.S. PATENT DOCUMENTS

| | | | |
|---|---|---|---|
| 2009/0325678 A1 | 12/2009 | Gomez | |
| 2010/0016061 A1 | 1/2010 | Gomez et al. | |
| 2010/0279760 A1* | 11/2010 | Sugiyama | G07F 17/3267 463/20 |
| 2012/0122544 A1* | 5/2012 | Roemer | G07F 17/3267 463/20 |
| 2013/0237307 A1* | 9/2013 | Wotton | G07F 17/3265 463/20 |
| 2014/0141860 A1* | 5/2014 | Meyer | G07F 17/3267 463/21 |
| 2014/0274316 A1* | 9/2014 | Elias | G07F 17/34 463/25 |
| 2015/0080095 A1* | 3/2015 | Nicely | G07F 17/34 463/20 |
| 2016/0027238 A1* | 1/2016 | Zurawski | G07F 17/3244 463/20 |
| 2016/0351007 A1* | 12/2016 | Singer | G07F 17/3216 |
| 2017/0140608 A1* | 5/2017 | Watkins | G07F 17/3213 |

\* cited by examiner

US 11,887,434 B2

INCREMENTING FEATURE IN GAMING DEVICE

RELATED APPLICATIONS

This application claims the benefit of Provisional Patent Application No. 62/072,168 filed on Oct. 29, 2014, to which priority is claimed pursuant to 35 U.S.C. § 119(e) and which is incorporated herein by reference in its entirety.

FIELD OF THE INVENTION

This disclosure relates generally to games, and more particularly to systems, apparatuses and methods for implementing an incrementing feature in gaming devices.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate implementing an incrementing feature in gaming devices. In one embodiment, a gaming device includes a display showing a game grid and a processor, where the processor is operable to receive a wager on a gaming event, determine an outcome for the gaming event, and determine if an incrementing symbol is present on a game grid when the determined game outcome is shown on the display. When the incrementing symbol is present, the processor is further operable to increment the incrementing symbol while maintaining at least the initial position of the incrementing symbol in the game grid during a subsequent game event.

DETAILED DESCRIPTION

Figure 1:
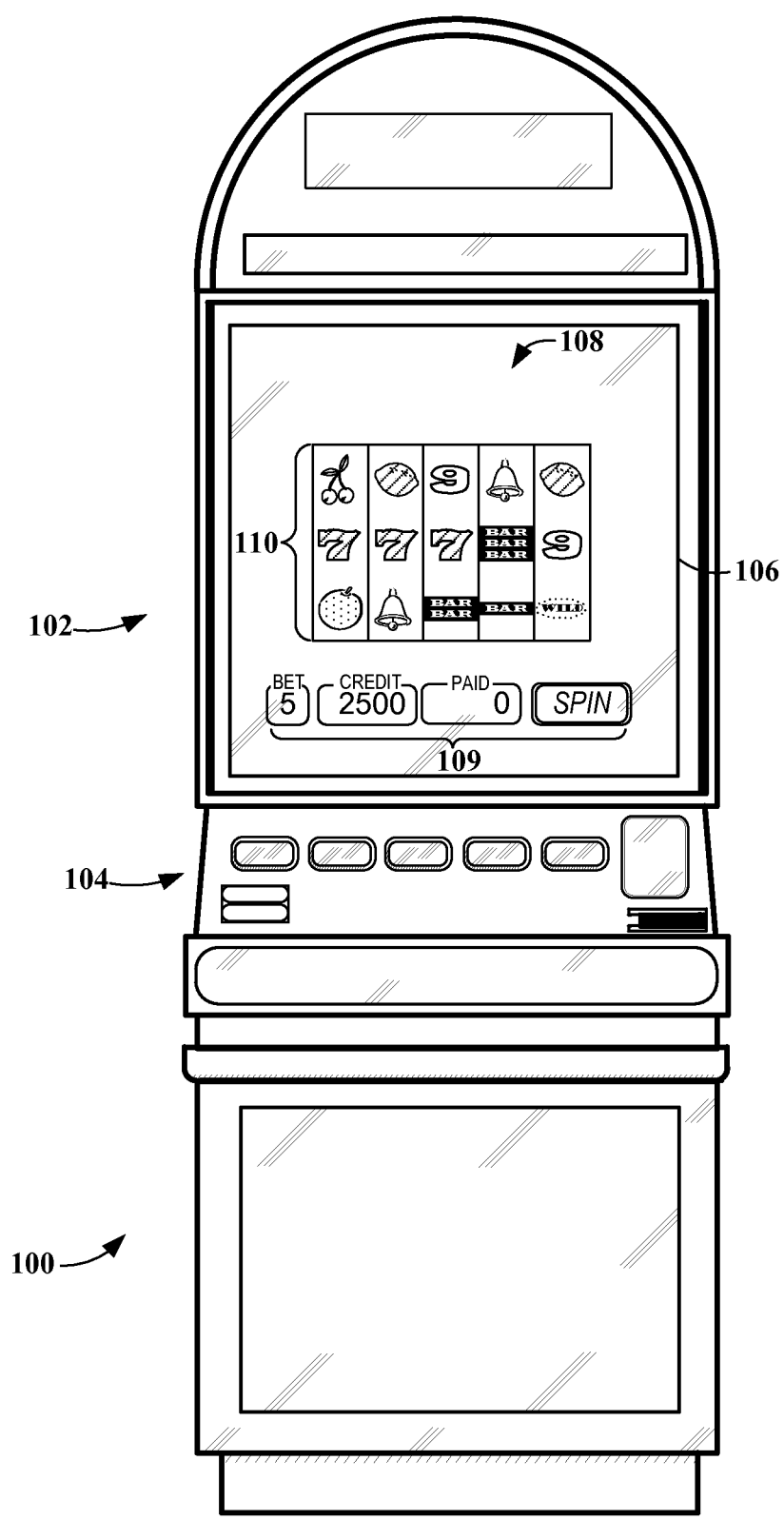
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those object (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for enhancing winning result opportunities in gaming activities by providing an incrementing feature. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. slot game) are provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that utilizes operations of an incrementing feature to enhance the game play on gaming devices. In one embodiment, a gaming device includes a display showing a game grid and a processor, where the processor is operable to receive a wager on a gaming event, determine an outcome for the gaming event, and determine if an incrementing symbol is present on a game grid when the determined game outcome is shown on the display. When the incrementing symbol is present, the processor is further operable to increment the incrementing symbol while maintaining at least the initial position of the incrementing symbol in the game grid during a subsequent game event.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of these inventive techniques in other types of slot games, poker games, or other games of chance. Some of these other types of embodiments will be discussed below as variations to the examples illustrated. However, many other types of games can implement similar techniques and fall within the scope of this inventive concept.

Referring to the example gaming apparatus 100 shown in FIG. 1, the gaming apparatus includes a display area 102 (also referred to as a gaming display), and a player interface area 104, although some or all of the interactive mechanisms included in the user interface area 104 may be provided via graphical icons used with a touch screen in the display area 102 in some embodiments. The display area 102 may include one or more game displays 106 (also referred to as "displays" or "gaming displays") that may be included in physically separate displays or as portions of a common large display. Here, the game display 106 includes a primary game play portion 108 that displays game elements and symbols 110, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as paytable information associated with a glass/plastic panel on the gaming machine 100 and/or graphical images. The symbols or other indicia associated with the play of the game may be presented on an electronic display device or on mechanical devices associated with a mechanical display. Generally, the display 106 devotes the largest portion of viewable area to the primary gaming portion 108. The primary gaming portion 108 is generally where the visual feedback for any selected game is provided to the user. The primary gaming portion 108 may render graphical objects such as cards, slot reels, dice, animated characters, and any other gaming visual known in the art. The primary gaming portion 108 also typically informs players of the outcome of any particular event, including whether the event resulted in a win or loss.

In some the example embodiments illustrated herein, the primary gaming portion 108 may display a grid (or equivalent arrangement) of game elements 110 or game element positions (also referred to as "reel stop positions" herein). As illustrated in the embodiment shown in FIG. 1, the grid includes three rows and five columns of game elements 110, which may form a game outcome of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual symbols, or user controls over stopping or spinning reels. The game display 106 of the display area 102 may include other features that are not shown, such as paytables, navigation controls, etc.

As mentioned above, embodiments of this concept include an incrementing feature that increments or progresses between game events or game stages within a single game event. In one embodiment, a special "wild" symbol that lands on a game grid expands (increments in size) in at least one subsequent game event. Thus, for example, a wild may be locked or main its location on the game grid from the first game event to the second game event, but may expand in the second game event to cover one other grid position adjacent to its original grid position for the second game event. The game events may be individual games of chance that have different wagers placed for each game event, or may be part of a free games bonus, where each game event is a separate free game within the bonus event. In yet other embodiments, the subsequent game events may be bonus game events that do not require additional wagers. For example, a wager may be placed on a first gaming event. If an incrementing symbol does not appear on the game grid as part of the outcome of the first gaming event, the first gaming event merely ends and the gaming device waits for additional inputs from the player. However, if an incrementing symbol appears on the game grid as part of the first gaming event (or another triggering condition), the incrementing symbol may be incremented and a second gaming event may be triggered without requiring an additional wager. In some embodiments, the wild symbol may continue to expand until it reaches an edge of the grid, or may continue to expand for a predetermined number of subsequent game events.

In other embodiments, the incrementing feature may increment in value (such as multiplier value for a wild or other symbol), increment in position (for example, move to the left without expanding), increment in symbol importance (for example, increment from a minor symbol to a major symbol, to a scatter symbol, to a wild symbol, to a bonus symbol), or may increment in any other manner over multiple game events.

The incrementing feature may be triggered by a special predefined symbol landing on the grid, may be triggered by one or more predefined symbols landing in a particular location on the grid, may be triggered at random, or may be triggered using a combination of the above criteria. In one example, a 5×5 game grid may be used with 5 spinning reels passing through the game grid. If a wild symbol lands on any reel in the third row of the grid (middle position horizontally), it acts as a wild for that spin. In the next spin, it locks into place and expands to cover the second, third, and fourth rows of its associated reel. On the third spin, the wild expands again to cover the entire reel (i.e., rows 1-5 of the associated reel). On the fourth spin, the wilds would disappear and the game would play as it did in the first spin where no symbols were locked into place on the game grid.

Although the above example, allows for a two-way expansion when a predefined symbol landed in a particular grid location, many variations are possible. In some embodiments, the symbols only increment by expanding in one predefined direction, such as down. Thus, a wild symbol landing in the first row (top) of a reel would expand down for another four games on a 5×5 grid. However, a wild landing on the bottom row would not expand or have any effect on a subsequent game. In another embodiment, a game may include a regular wild, and a special wild having a direction pointer and value. These special wilds may lock into place and expand in the direction indicated by the direction pointer for a number of gaming events equal to the value associated with the special symbol.

In other embodiments, a special symbol may be incremented in value. For example, a wild landing in the middle row of the third reel, may increment in a multiplier value for a predetermined or random number of times. For example, upon landing in the third row of the third reel, a processor associated with the gaming device may randomly determine that the wild will increment for next the 5 games. This information may be displayed to the player, or may remain a mystery to the player. Thus, over the next 5 games the multiplier may increment from 1× to 2× to 3× . . . 6×. In other embodiments, the value may be incremented in a non-linear, or even a partially random manner.

In yet other embodiments that include multiple game grids, the incrementing process may be incremented on the different game grids. Thus, a special symbol landing in the first game grid of a gaming event may be copied and expanded (or otherwise incremented) in the second game grid. This may continue for as many game grids as appear on the game display simultaneously. Thus, in a game display showing four separate game grids, a special symbol landing in the first game grid may be copied over to a corresponding location in the second game grid and expanded to cover at least one more grid position. Then the expanded special symbol from the second grid may be copied over to corresponding grid locations in the third game grid and again expanded by one or more positions. This process may repeat itself from the third game grid to the fourth game grid. Although the above example is discussed in terms of the size-increments (expanded symbol positions on the game grid), other embodiments use similar techniques to increment a multiplier value on a special symbol that appears on the game grids. This may or may not include copying the special symbol between game grids. In one example that does not use symbol position copying, a wild landing in the first game grid may be worth 1×. If a wild does land in the first game grid, then the sum of them, if more than one, is added to a multiplier value for any wilds appearing in the second game grid. For example, if 2 wilds were received in the first game grid, any wilds landing in the second game grid would be worth "3×." This technique could continue for any number of game grids present in the game.

FIGS. 2A-2F, 3A-3C, and 4A-4C illustrate game progressions showing some of the embodiments discussed above.

Figure 2A:
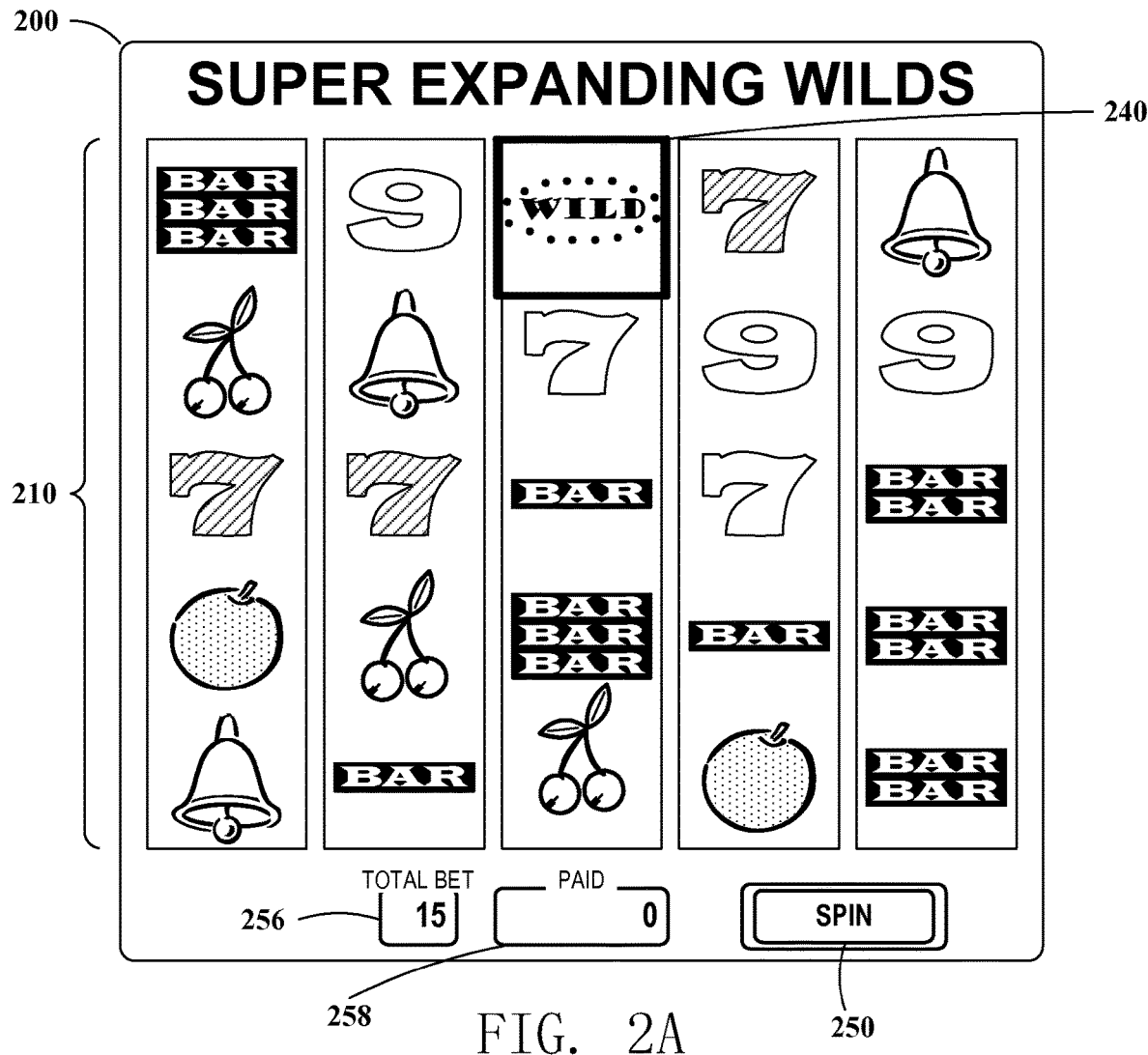
FIGS. 2A, 2B, 2C, 2D, 2E and 2F are detail diagrams of a display of a gaming device showing a game progression according to embodiments of the invention.
Figure 2B:
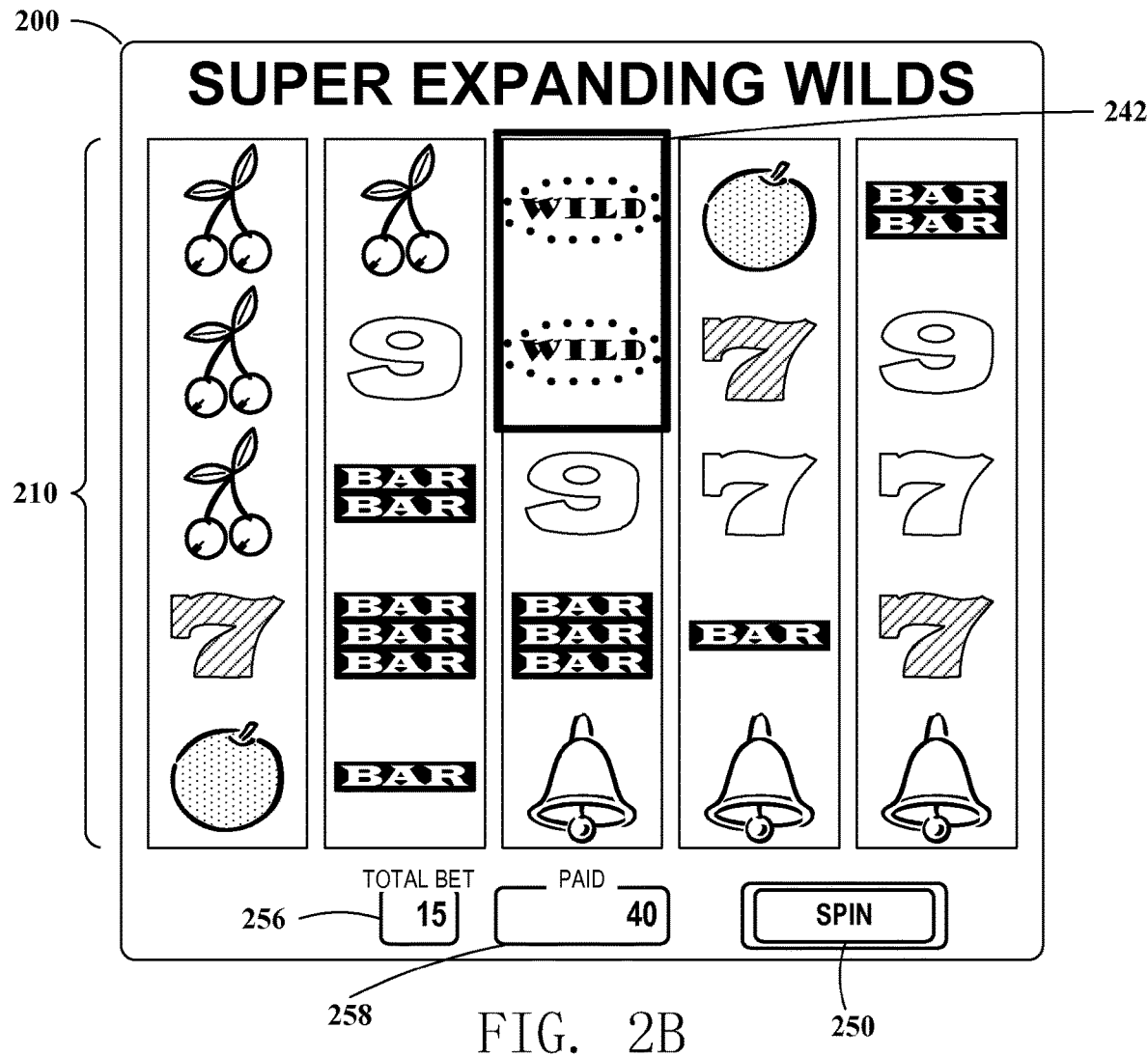
Figure 2C:
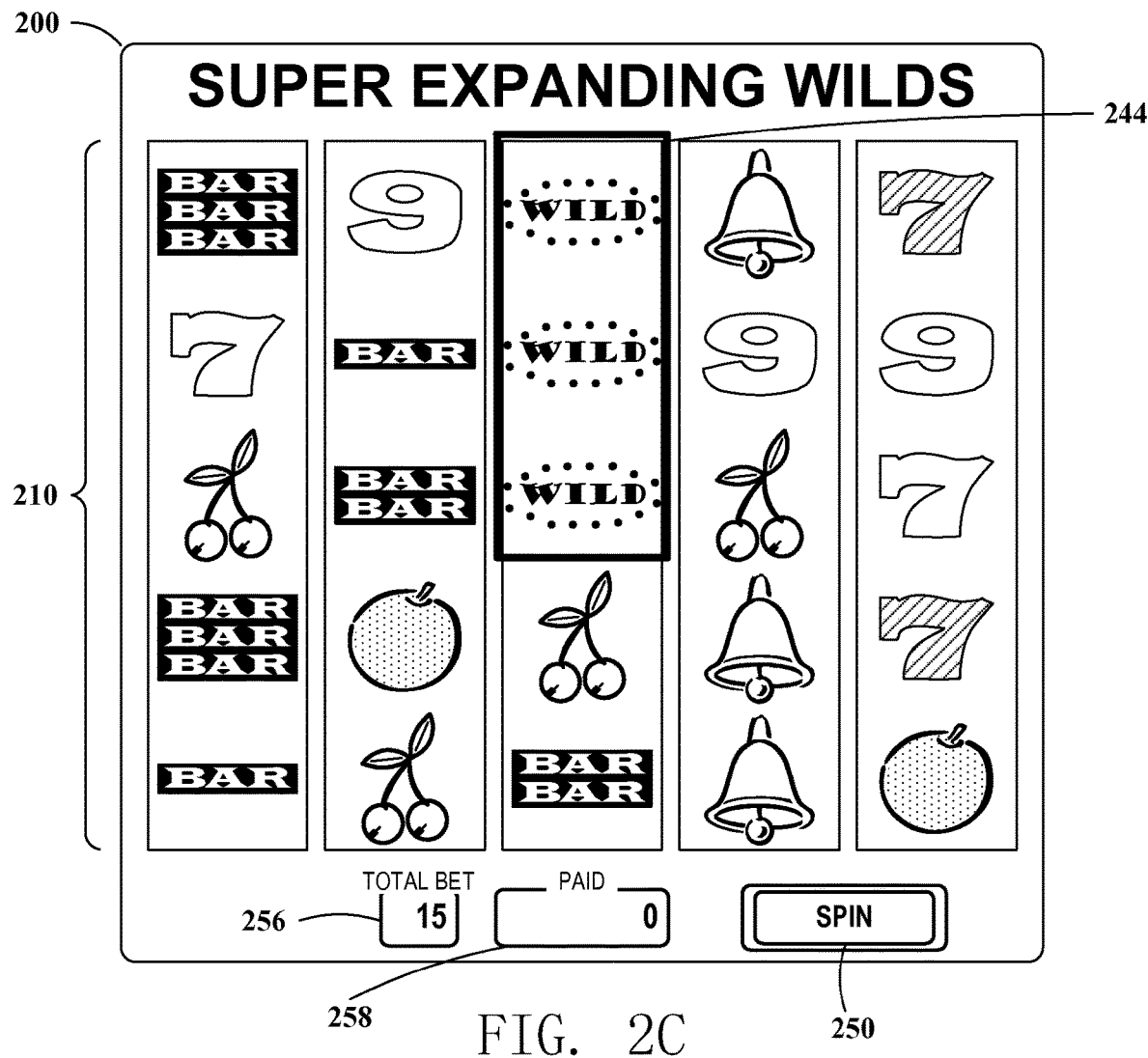

Referring to FIGS. 2A-2F, if a wild symbol is received on the game grid, that wild is locked for a next game event and expanded one step down (i.e., copied to the adjacent symbol position below the locked wild symbol) until it reaches a bottom edge of the game grid. In particular, a game display 200 includes a game grid 210 of symbol positions where game reels spin through the game grid during play of the gaming event. The game display 200 may also include a player interface that includes meters and buttons to convey information about the game to the player and allow the player to interaction with the gaming device. For example, the game display 200 illustrated in these figures includes a total bet meter 256, an award meter 258, and "SPIN" button 250, although additional player interface elements may be present in other embodiments. Referring to FIG. 2A, a gaming event is played and an incrementing symbol 240 is part of the game outcome that is displayed on the game grid 210. As shown in FIG. 2B, the incrementing symbol 240 is copied or expands to replace the adjacent symbol below it and form a locked incrementing symbol 242 that is fixed on the game grid 210 during a second gaming event. FIG. 2C, shows a third game event where the locked incrementing symbol 244 again increments or expands to the next adjacent symbol position in the game grid.

Figure 2D:
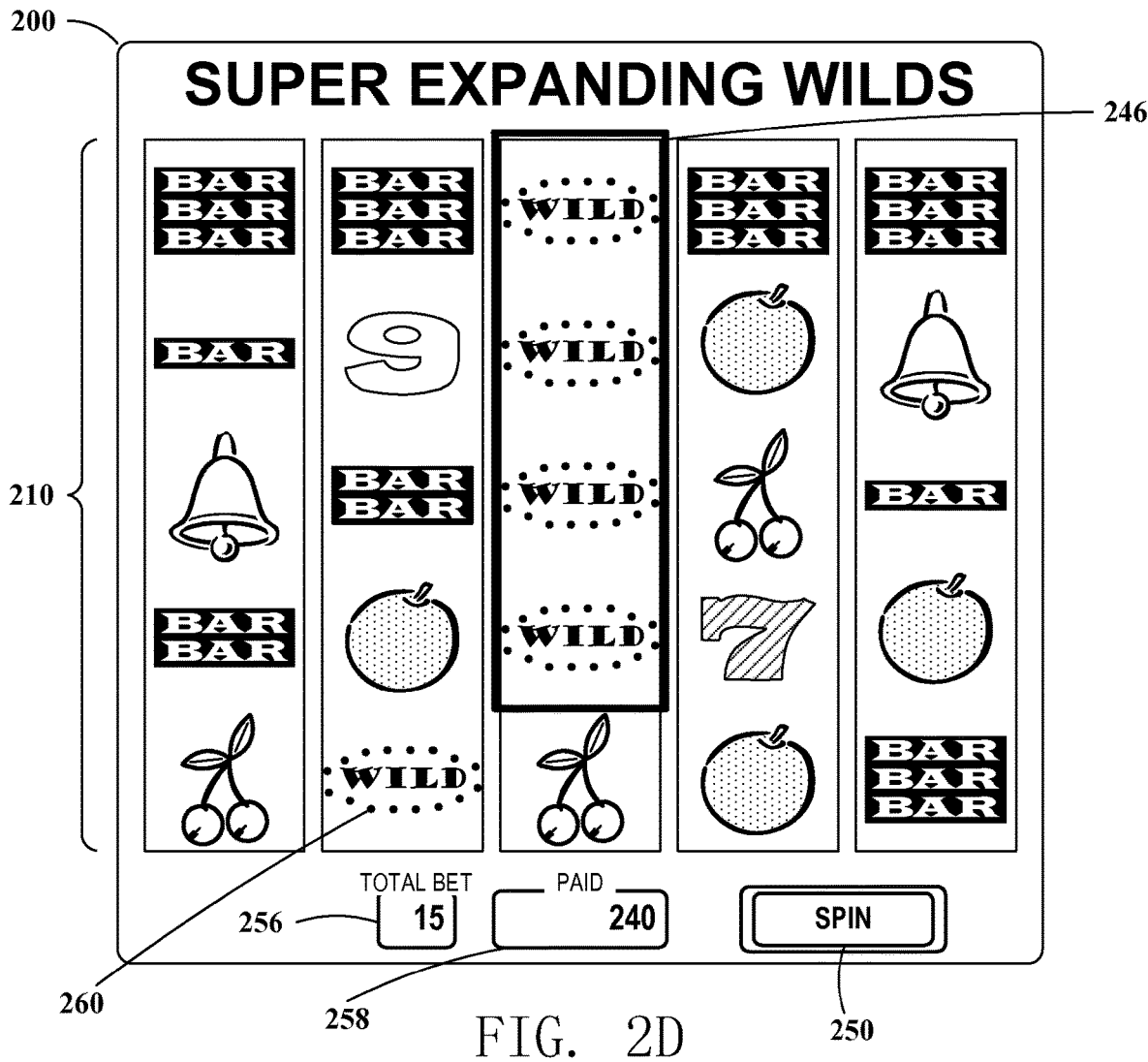
Figure 2E:
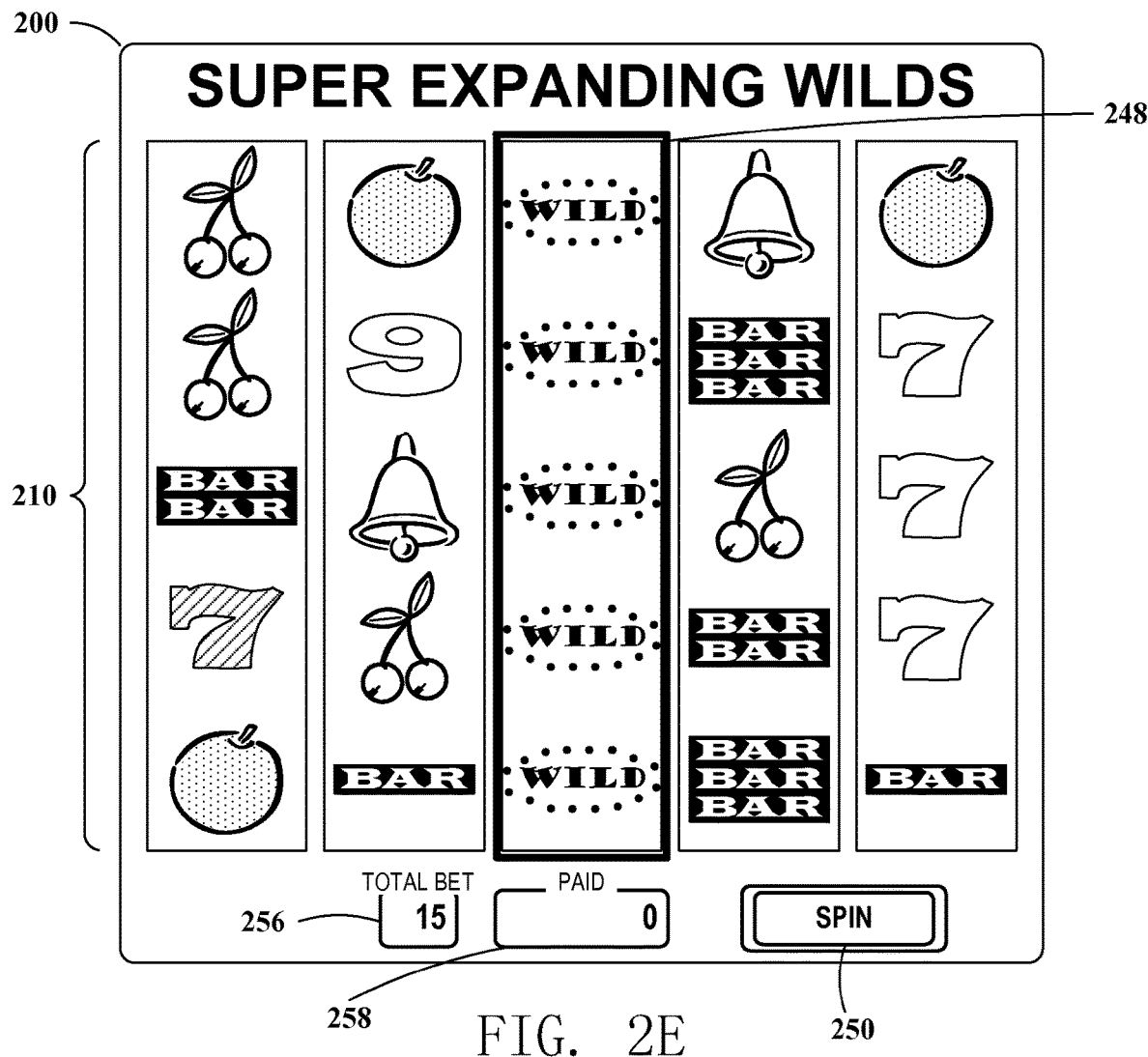
Figure 2F:
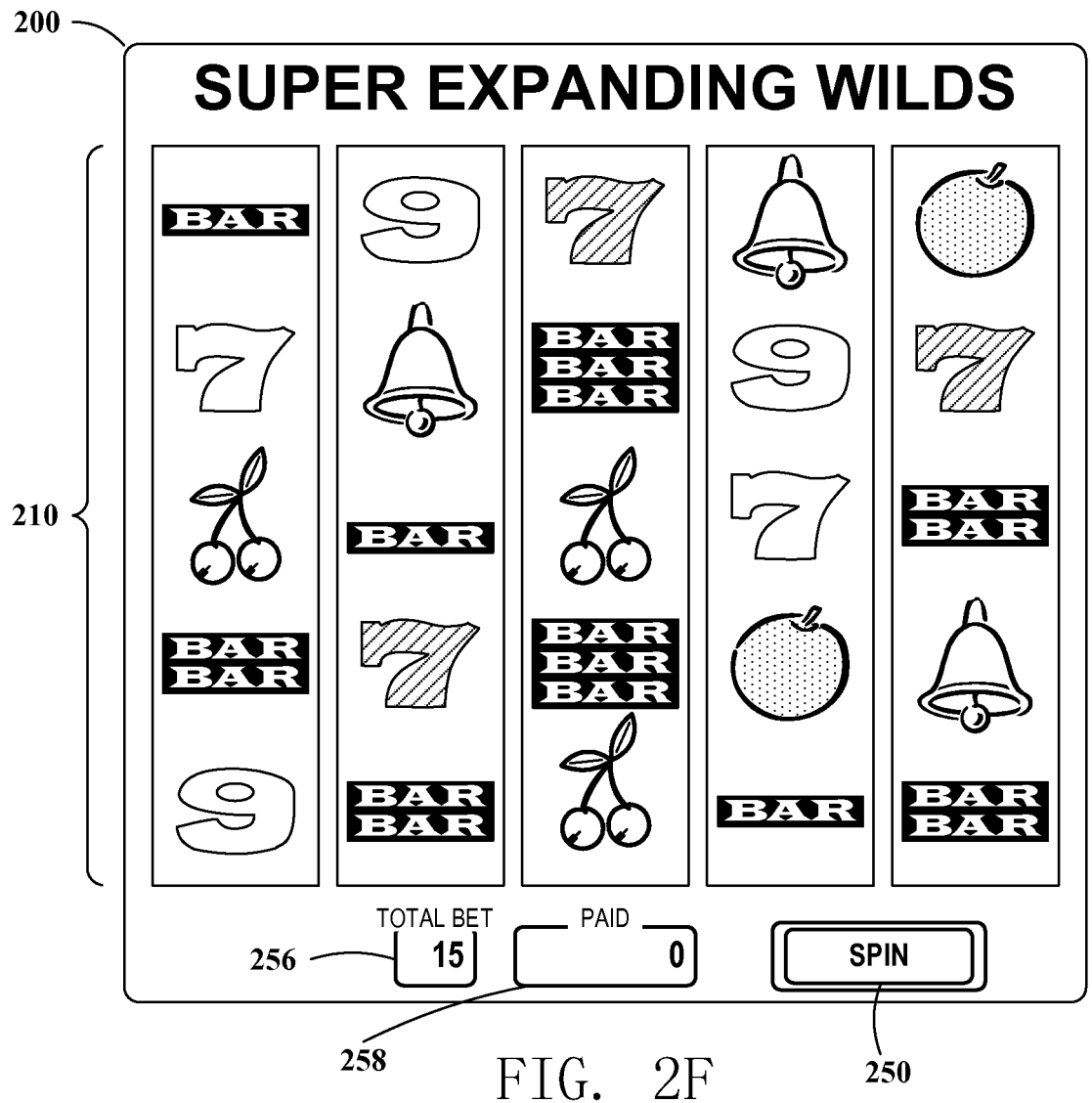

This process is repeated in a fourth gaming event shown in FIG. 2D, where the locked incrementing symbol 246 again increments or expands in the game grid 210. As can be seen in FIG. 2D, if another wild lands on the bottom position of the game grid, it does not get locked or expanded in subsequent games. In other embodiments, only specially marked wilds may lock and expand. In yet other embodiments, wilds only lock and expand if no other wilds are currently locked on the game grid. In FIG. 2E, the locked incrementing symbol 248 again increments or expands to an adjacent symbol position in the game grid 210 for a fifth gaming event. Here, since the incremented symbol 248 has reached an edge of the game grid 210 (i.e., it reaches a symbol position that has a game grid edge opposite from where the symbol has been copied from), the locked incrementing symbol 248 will be removed for the next or sixth gaming event as shown in FIG. 2F.

Figure 3A:
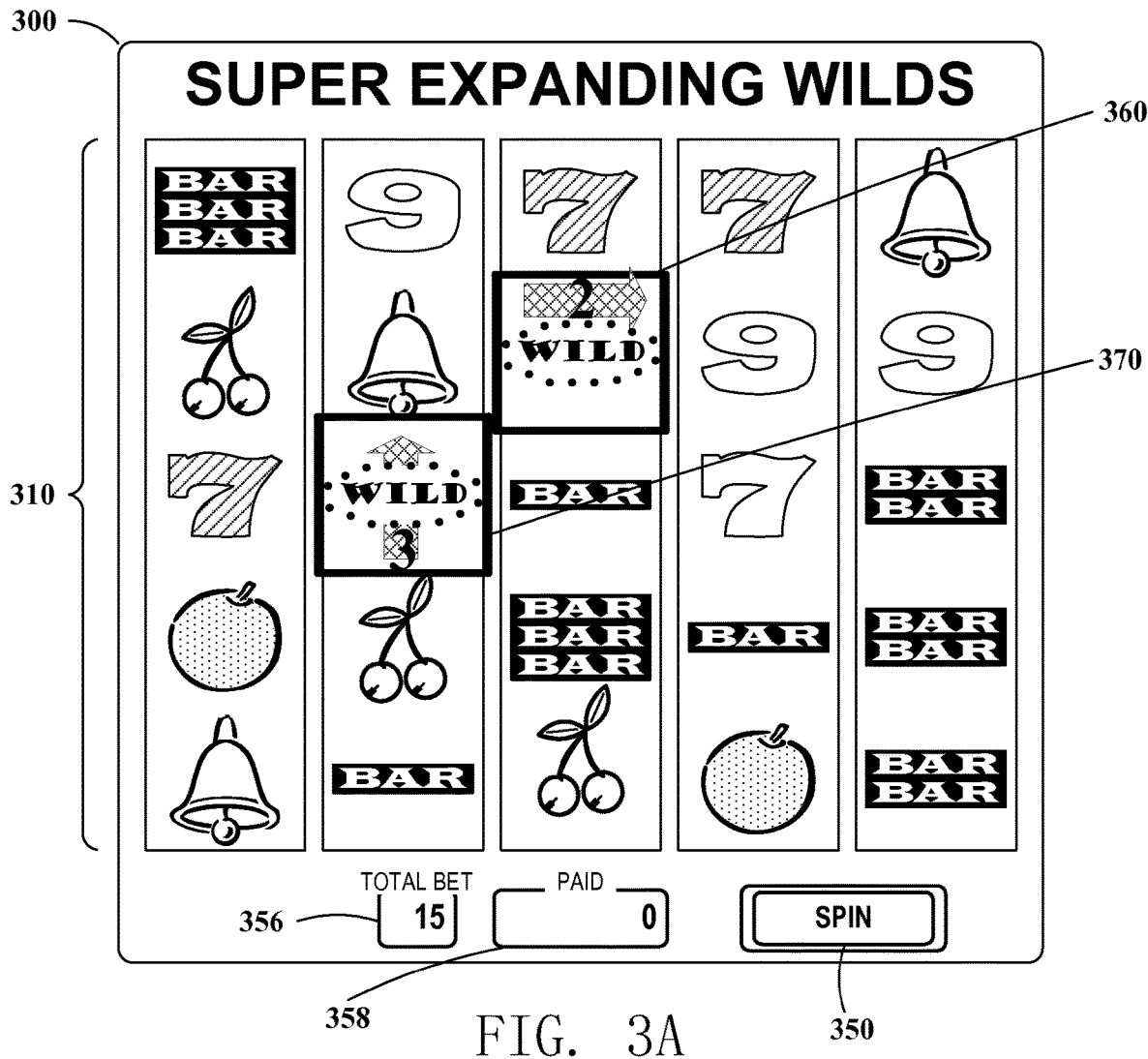
FIGS. 3A, 3B, and 3C are detail diagrams of a display of a gaming device showing another game progression according to embodiments of the invention.
Figure 3B:
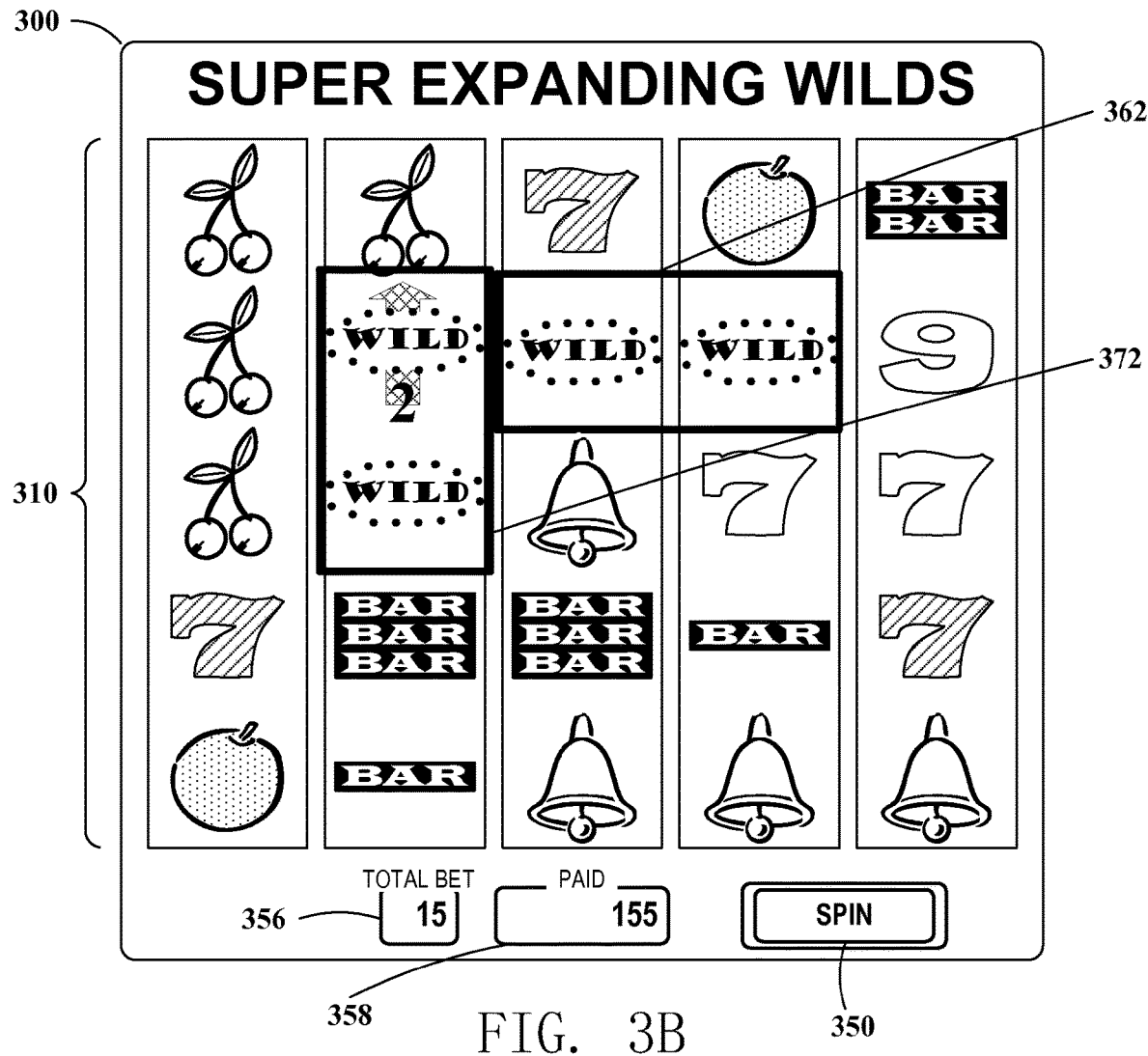
Figure 3C:
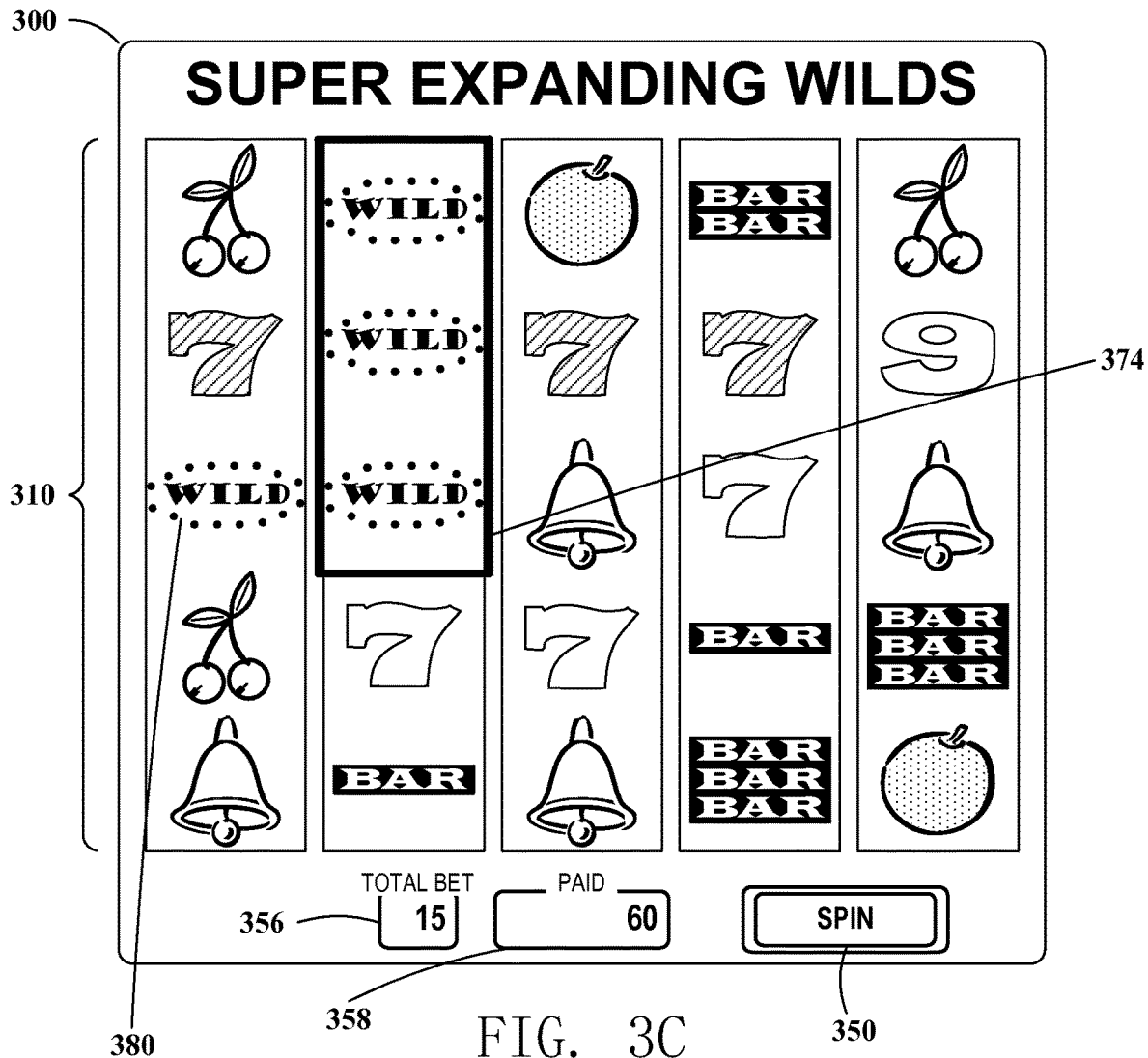

Referring to FIGS. 3A-3C, special wild symbols with an arrow and value are locked and expanded in the direction of the arrow for the number of games indicated by the value. In particular, a game display 300 includes a game grid 310 of symbol positions where game reels spin through the game grid during play of the gaming event. The game display 300 may also include a player interface that includes meters and buttons to convey information about the game to the player and allow the player to interaction with the gaming device. For example, the game display 300 illustrated in these figures includes a total bet meter 356, an award meter 358, and "SPIN" button 350, although additional player interface elements may be present in other embodiments. Referring to FIG. 3A, two special wilds are received 360, 370 where one of the symbols indicates that it will be alive for 3 games and expand in an upward direction (wild 360) while the other indicates that it will be alive only for the current game and next game while expanding to the right (wild 370). These directional indicators and incremental values associated with the incrementing symbols 360, 370 will be used to characterize how the incrementing symbols behave in the subsequent gaming events. As shown in FIG. 3B, the wilds 362, 372 have expanded in the direction indicated by the directional arrows. In FIG. 3C, only the vertically expanding wild 374 is left since it was alive for three games, while the horizontally expanding wild (370 in FIG. 3A) has been removed as it has exceeded the two games specified by the original value associated with it. These values may be predetermined and placed on the reel strips, or may be determined at random when the special wild lands. Similarly, the directional indicators/arrows may have predetermined directions, or the directions may be determined at random when the special wild lands. Note also in FIG. 3C that a non-special wild 380 is received, but does not have a direction or value associated with it. Thus, this wild 380 will not lock and increment in the next game event.

Figure 4A:
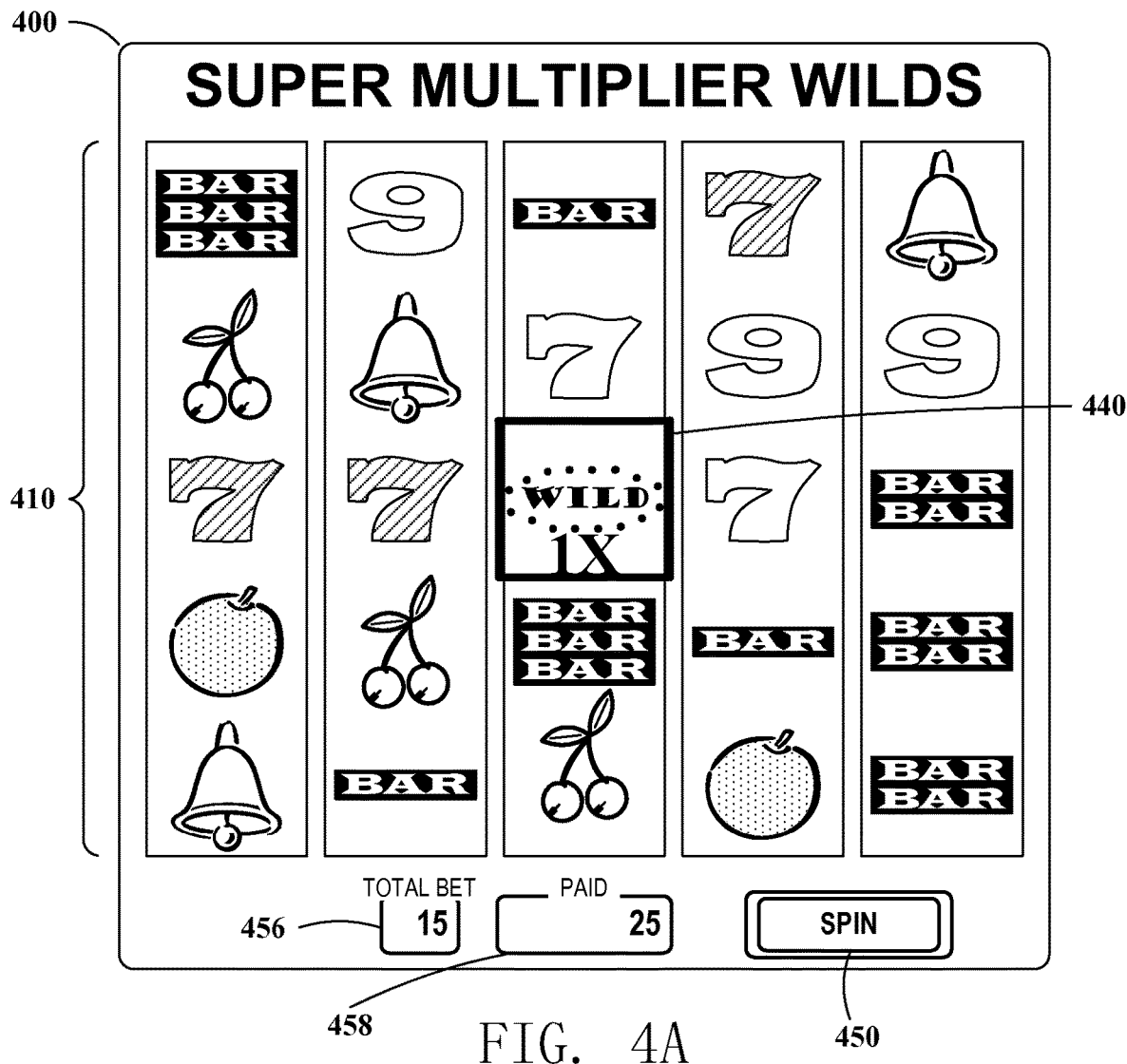
FIGS. 4A, 4B, and 4C are detail diagrams of a display of a gaming device showing another game progression according to embodiments of the invention.
Figure 4B:
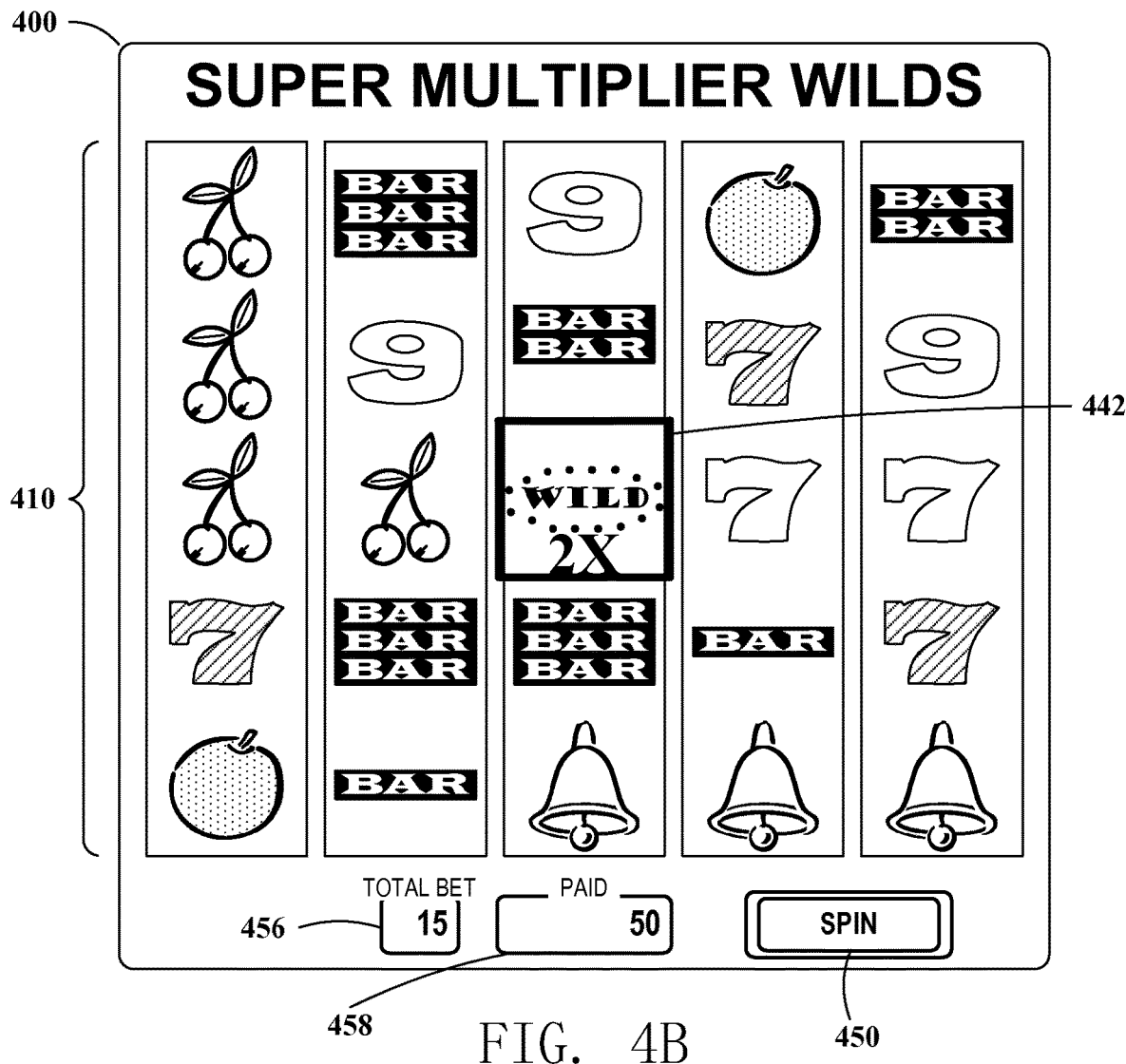
Figure 4C:
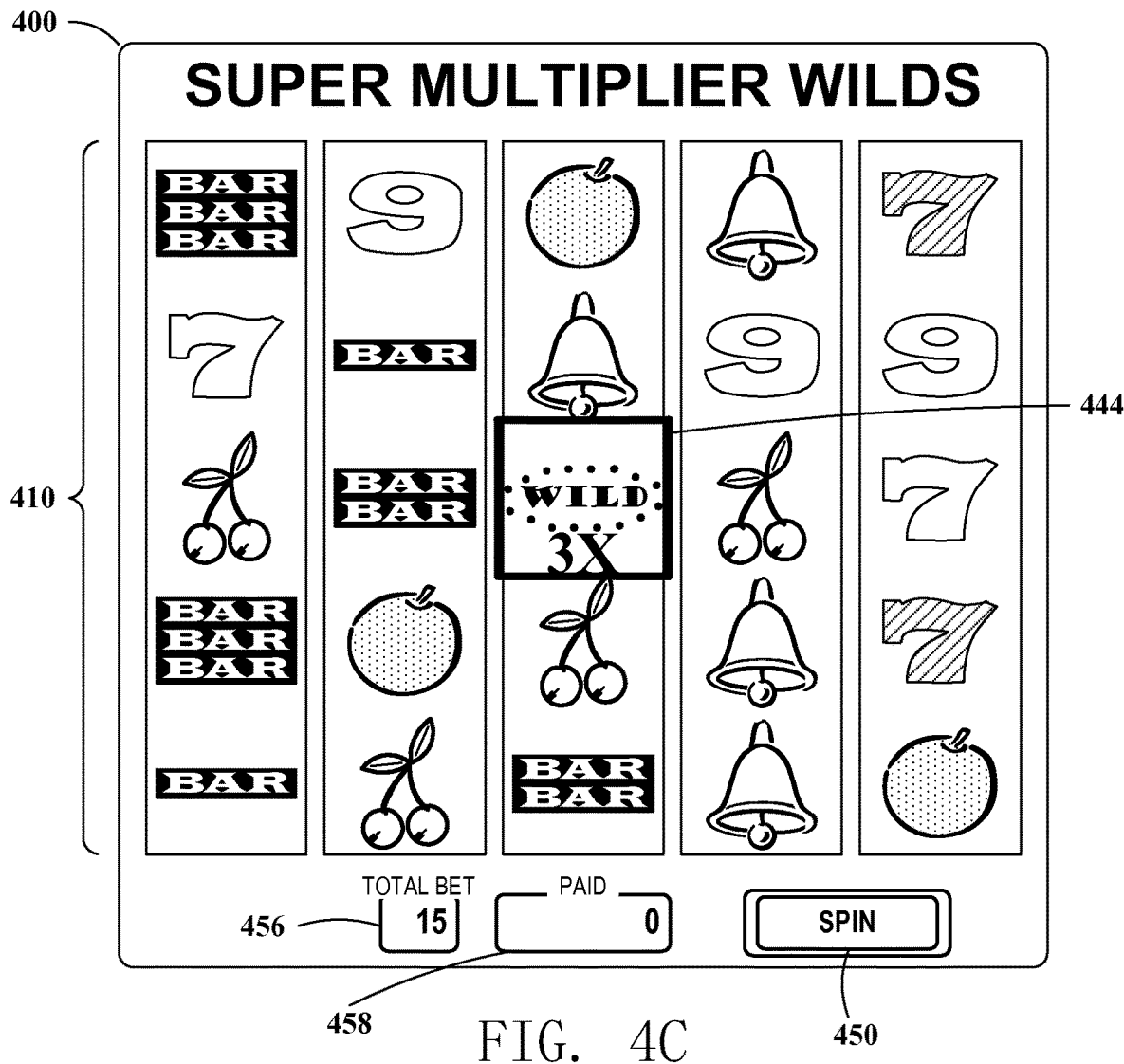

Referring to FIGS. 4A-4C, a wild 440 landing in the middle row of any reel will lock and increment in multiplier value for a randomly chosen number of gaming events. In this illustrated example, the wild is locked and the multiplier value is incremented over the next two games. Thus, it reaches a value of "3×" before going away for the fourth game in the series (the third game after it was received). In particular, a game display 400 includes a game grid 410 of symbol positions where game reels spin through the game grid during play of the gaming event. The game display 400 may also include a player interface that includes meters and buttons to convey information about the game to the player and allow the player to interaction with the gaming device. For example, the game display 400 illustrated in these figures includes a total bet meter 456, an award meter 458, and "SPIN" button 450, although additional player interface elements may be present in other embodiments. As shown in FIG. 4A, the incrementing symbol 440 is received during a first gaming event with a multiplier value of "1×." Hence, any winning symbol combinations that use the incrementing symbol will be multiplied by the multiplier value, which in this case won't change the award amount.

Referring to FIG. 4B, the incrementing symbol 442 is now incremented to have a "2×" multiplier value for the second gaming event. Here, the three "cherry" pay of 25 credits is multiplied by the "2×" to pay 50 credits as shown in the Award meter 458. In FIG. 4C, the incrementing symbol 444 has its associated multiplier value incremented to "3×." In this embodiment, as mentioned above, the maximum value for the incrementing multiplier is "3×". However, in other embodiments, the maximum value of the multiplier may be randomly selected, based on other received symbols or game conditions, or simply be another predefined number. In other embodiments, the multiplier value may continue to increment until it is used to multiply an award for a symbol combination that includes the incrementing symbol. Additionally, while the multiplier value is shown as incrementing by "1×" for each gaming event, the multiplier value may by incremented in different manners, which may be predefined, or determined in part by symbols received on the game grid or other game conditions. Additionally, the initial multiplier value may be different from "1×," and may be selected at random.

As discussed above, many different embodiments and variations are possible where a property of a symbol is incremented or stepped over multiple game events. Thus, while some embodiments have been shown or discussed in detail, many additional embodiments or variations are possible and fall within the scope and spirit of this invention.

Figure 5:
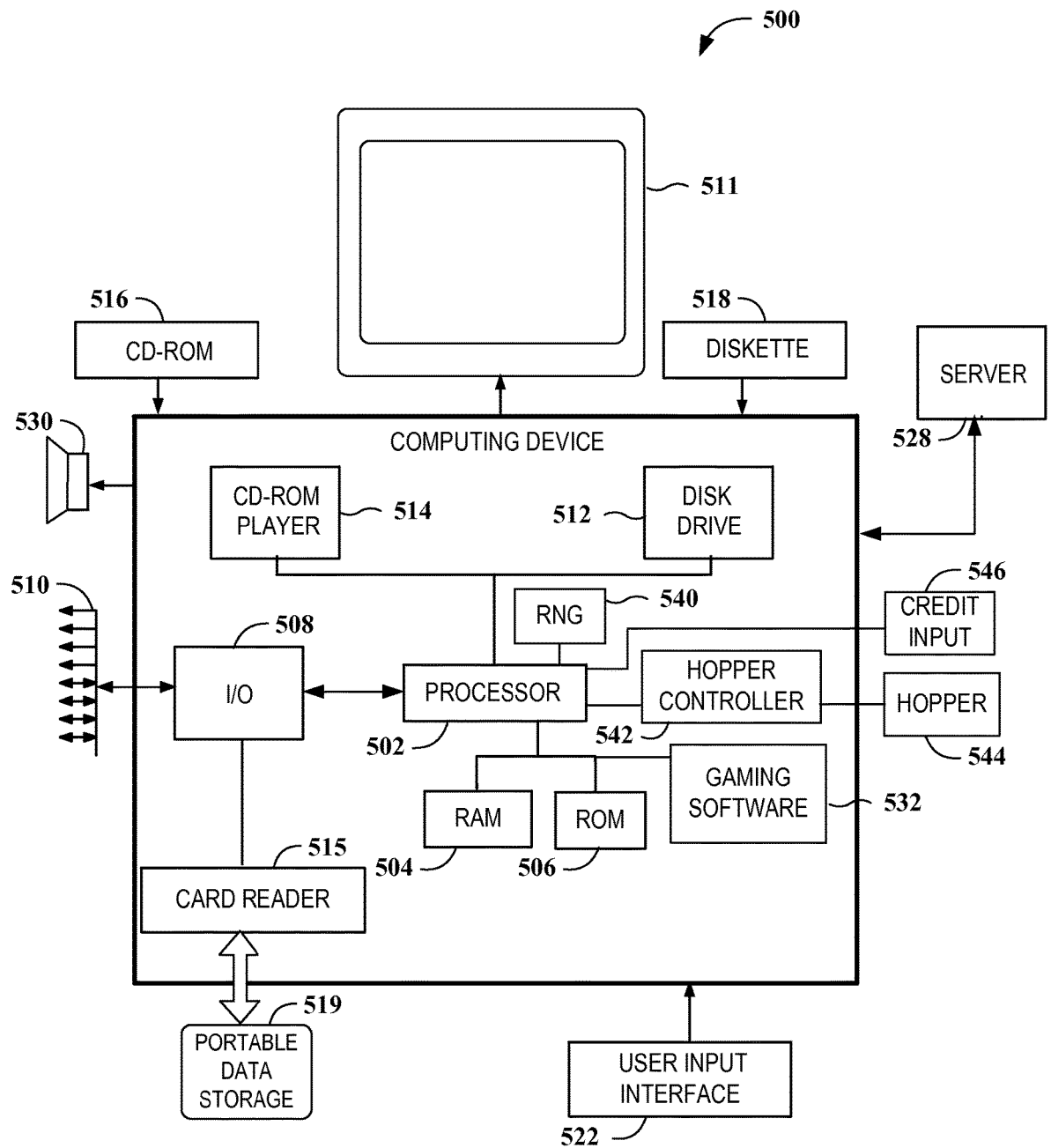
FIG. 5 is a block diagram illustrating a computing arrangement according to embodiments of the invention.

As may now be readily understood, one or more devices may be programmed to play various embodiments of the invention. The present invention may be implemented as a casino gaming machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 5.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 500 of FIG. 5 is an example computing structure that can be used in connection with such electronic gaming machines, computers, or other computer-implemented devices to carry out operations of the present invention.

The example computing arrangement 500 suitable for performing the gaming functions in accordance with the present invention typically includes a central processor (CPU) 502 coupled to random access memory (RAM) 504 and some variation of read-only memory (ROM) 506. The ROM 506 may also represent other types of storage media to store programs, such as programmable ROM (PROM), erasable PROM (EPROM), etc. The processor 502 may communicate with other internal and external components through input/output (I/O) circuitry 508 and bussing 510, to provide control signals, communication signals, and the like.

The computing arrangement 500 may also include one or more data storage devices, including hard and floppy disk drives 512, CD-ROM drives 514, card reader 515, and other hardware capable of reading and/or storing information such as DVD, etc. In one embodiment, software for carrying out the operations in accordance with the present invention may be stored and distributed on a CD-ROM 516, diskette 518, access card 519, or other form of computer readable media capable of portably storing information. These storage media may be inserted into, and read by, devices such as the CD-ROM drive 514, the disk drive 512, card reader 515, etc. The software may also be transmitted to the computing arrangement 500 via data signals, such as being downloaded electronically via a network, such as the Internet. Further, as previously described, the software for carrying out the functions associated with the present invention may alternatively be stored in internal memory/storage of the computing device 500, such as in the ROM 506.

The computing arrangement 500 is coupled to the display 511, which represents a display on which the gaming activities in accordance with the invention are presented. The display 511 represents the "presentation" of the video information in accordance with the invention, and may be any type of known display or presentation screen, such as liquid crystal displays, plasma displays, cathode ray tubes (CRT), digital light processing (DLP) displays, liquid crystal on silicon (LCOS) displays, etc.

Where the computing device 500 represents a stand-alone or networked computer, the display 511 may represent a standard computer terminal or display capable of displaying multiple windows, frames, etc. Where the computing device is embedded within an electronic gaming machine, the display 511 corresponds to the display screen of the gaming machine/kiosk. A user input interface 522 such as a mouse, keyboard/keypad, microphone, touch pad, trackball, joystick, touch screen, voice-recognition system, etc. may be provided. The display 511 may also act as a user input device, e.g., where the display 511 is a touchscreen device. In embodiments, where the computing device 500 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs as known in the art may be implemented using hardware, software operable in connection with the processor 502, or some combination of hardware and software. The present invention is operable using any known RNG, and may be integrally programmed as part of the processor 502 operation, or alternatively may be a separate RNG controller 540.

The computing arrangement 500 may be connected to other computing devices or gaming machines, such as via a network. The computing arrangement 500 may be connected to a network server 528 in an intranet or local network configuration. The computer may further be part of a larger network configuration as in a global area network (GAN) such as the Internet. In such a case, the computer may have access to one or more web servers via the Internet. In other arrangements, the computing arrangement 500 may be configured as an Internet server and software for carrying out the operations in accordance with the present invention may interact with the player via one or more networks. The computing arrangement 500 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 500 may also include a hopper controller 542 to determine the amount of payout to be provided to the participant. The hopper controller may be integrally implemented with the processor 502, or alternatively as a separate hopper controller 542. A hopper 544 may also be provided in gaming machine embodiments, where the hopper serves as the mechanism holding the coins/tokens of the machine. The wager input module or device 546 represents any mechanism for accepting coins, tokens, coupons, bills, electronic fund transfer (EFT), tickets, credit cards, smart cards, membership/loyalty cards, etc., for which a participant inputs a wager amount. The wager input device 546 may include magnetic strip readers, bar code scanners, light sensors, or other detection devices to identify and validate physical currency, currency-based tickets, cards with magnetized-strips, or other medium inputted into the wager input device. When a particular medium is received in the wager input device 546, a signal may be generated establish or increase an available credit amount stored in the internal memory/storage of the computing device 500, such as in the RAM 504. Thereafter, specific wagers placed on games may reduce the available credit amount, while awards won may increase the available credit amount. It will be appreciated that the primary gaming software 532 may be able to control payouts via the hopper 544 and controller 542 for independently determined payout events.

Among other functions, the computing arrangement 500 provides an interactive experience to players via input interface 522 and output devices, such as the display 511, speaker 530, etc. These experiences are generally controlled by gaming software 532 that controls a primary gaming activity of the computing arrangement 500. The gaming software 532 may be temporarily loaded into RAM 504, and may be stored locally using any combination of ROM 506, drives 512, media player 514, or other computer-readable storage media known in the art. The primary gaming software 532 may also be accessed remotely, such as via the server 528 or the Internet.

The primary gaming software 532 in the computing arrangement 500 is shown here as an application software module. According to embodiments of the present invention, this software 532 provides a slot game or similar game of chance as described hereinabove. For example, the software 532 may present, by way of the display 511, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 532 may include instructions to provide other functionality as known in the art and described herein, such as shown and described above regarding FIGS. 1-4C.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A gaming device comprising:
 a game display having a game grid of symbol positions showing portions of a plurality of game reels;
 a wager input device structured to receive physical currency or currency based tickets, the currency or currency based tickets establishing a credit balance, the credit balance being increasable or decreasable based at least on wagering activity; and
 a processor configured to:
  receive a first signal to initiate a first game of chance in response to placement of a first wager, the first wager decreasing the credit balance from a first credit balance amount to a second credit balance amount;
  determine an outcome for the first game of chance by randomly determining symbols to be displayed in the game grid on the game display;
  display the determined outcome of the first game of chance on the game display by spinning the plurality of game reels and stopping the plurality of game reels to show the determined outcome of the first game of chance in the symbol positions of the game grid;
  provide any first awards for symbol combinations based on the determined outcome of the first game of chance, where the provided first awards increase the credit balance from the second credit balance amount to a third credit balance amount;
  determine if an incrementing symbol appears on the game grid as part of the determined outcome for the first game of chance;
  receive a second signal to initiate a second game of chance after any first awards are provided based on the determined outcome of the first game of chance, the second game of chance initiated in response to placement of a second wager, the second wager decreasing the credit balance from the third credit balance amount to a fourth credit balance amount, where the second game of chance is independent of the first game of chance;
  when it is determined that an incrementing symbol appears on the game grid in the first game of chance and a second game of chance has been initiated:
   increment the incrementing symbol by copying the incrementing symbol and replacing a symbol in an adjacent symbol position with a copy of the incrementing symbol, and
   lock the incrementing symbol and the copy of the incrementing symbol in their respective symbol positions on the game grid during the second game of chance;
  determine an outcome for the second game of chance by maintaining the positions of the locked symbols on the game grid and randomly determining symbols to be displayed in non-locked symbol positions of the game grid;
  display the determined outcome for the second game of chance on the game display by spinning the plurality of reels while maintaining the positions of the locked symbols on the game grid, and stopping the plurality of game reels to show the determined outcome for the second game of chance in the symbol positions of the game grid; and
  provide any second awards for symbol combinations based on the determined outcome of the second game of chance, where the provided second awards increase the credit balance from the fourth credit balance amount to a fifth credit balance amount.

2. The gaming device of claim 1, wherein the incrementing symbol is incremented by copying the incrementing symbol to a symbol position vertically adjacent to the symbol position of the incrementing symbol.

3. The gaming device of claim 1, wherein the incrementing symbol includes a directional indicator.

4. The gaming device of claim 3, wherein the incrementing symbol is incremented by copying the incrementing symbol to a symbol position adjacent to the symbol position of the incrementing symbol in the direction indicated by the direction indicator associated with the incrementing symbol.

5. The gaming device of claim 4, wherein a new directional indicator is associated with the copied incrementing symbol, where the direction indicated by the new directional indicator is randomly selected.

6. The gaming device of claim 4, wherein a new directional indicator is associated with the copied incrementing symbol, where the direction indicated by the new directional indicator is the same direction as the directional indicator associated with the incrementing symbol.

7. The gaming device of claim 1, wherein the processor is further configured to increment the incrementing symbol by copying the incrementing symbol and replacing a symbol in an adjacent symbol position with the incrementing symbol in subsequent games of chance until a copied incrementing symbol occupies a symbol position of the grid that includes a grid edge in an opposite direction from the symbol position from which the copied incrementing symbol was copied from.

8. The gaming device of claim 1, wherein the incrementing symbol includes an incremental number indicator, that is decremented when the incremented symbol is copied.

9. The gaming device of claim 8, wherein the processor is further configured to increment the incrementing symbol by copying the incrementing symbol and replacing a symbol in an adjacent symbol position with the incrementing symbol in subsequent games of chance until the incremental number indicator reaches a minimum value.

10. A gaming device comprising:
 a game display having a game grid of symbol positions;
 a wager input device structured to receive physical currency or currency based tickets, the currency or currency based tickets establishing a credit balance, the credit balance being increasable or decreasable based at least on wagering activity; and
 a processor configured to:
  receive a first signal to initiate a first game of chance in response to placement of a first wager, the first wager decreasing the credit balance from a first credit balance amount to a second credit balance amount;
  determine an outcome for the first game of chance by randomly determining symbols to be displayed in the game grid on the game display;
  display the determined outcome of the first game of chance on the game display;
  determine if an incrementing multiplier symbol appears on the game grid as part of the determined outcome for the first game of chance, the incrementing multiplier symbol associated with a first multiplier value;
  provide any first awards for symbol combinations based on the determined outcome of the first game of chance, where any first awards associated with symbol combinations that include the incrementing multiplier symbol are multiplied by the first multiplier value of the incrementing multiplier symbol, and where the provided first awards as multiplied by the first multiplier value of the incrementing multiplier increase the credit balance from the second credit balance amount to a third credit balance amount;
  receive a second signal to initiate a second game of chance in response to placement of a second wager, the second wager decreasing the credit balance from the third credit balance amount to a fourth credit balance amount, where the second game of chance is independent of the first game of chance;
  when it has been determined that an incrementing multiplier symbol appears on the game grid in the first game of chance and the second game of chance has been initiated:
   increment the first multiplier value to generate a second multiplier value associated with the incrementing multiplier symbol, and
   lock the incrementing multiplier symbol in the symbol position on the game grid during the second game of chance;
  determine an outcome for the second game of chance by maintaining the position of the locked incrementing multiplier symbol on the game grid and randomly determining symbols to be displayed in non-locked symbol positions of the game grid; and
  provide any second awards for symbol combinations based on the determined outcome of the second game of chance, where provided second awards increase the credit balance from the fourth credit balance amount to a fifth credit balance amount.

11. The gaming device of claim 10, wherein the incrementing multiplier symbol is a wild symbol that substitutes for at least one other symbol.

12. The gaming device of claim 10, wherein the processor is further configured to increment the incrementing multiplier symbol in subsequent games of chance until a multiplier value associated with the incrementing multiplier symbol reaches a predefined maximum value.

13. The gaming device of claim 10, wherein the processor is further configured to increment the incrementing multiplier symbol in subsequent games of chance for a predefined number of subsequent games of chance.

14. The gaming device of claim 10, wherein the processor is further configured to increment the incrementing multiplier symbol in subsequent games of chance until the incrementing multiplier symbol is used in a symbol combination associated with an award.

15. A gaming device comprising:
 a game display having a game grid of symbol positions showing portions of a plurality of game reels;
 a wager input device structured to receive physical currency or currency based tickets, the currency or currency based tickets establishing a credit balance, the credit balance being increasable or decreasable based at least on wagering activity; and
 a processor configured to:
  receive a first signal to initiate a first game of chance in response to placement of a first wager, the first wager decreasing the credit balance from a first credit balance amount to a second credit balance amount;
  determine an outcome for the first game of chance by randomly determining symbols to be displayed in the game grid on the game display;
  display the determined outcome of the first game of chance on the game display by spinning the plurality of game reels and stopping the plurality of game reels to show the determined outcome of the first game of chance in the symbol positions of the game grid;
  provide any first awards for symbol combinations based on the determined outcome of the first game of chance, where the provided first awards increase the credit balance from the second credit balance amount to a third credit balance amount;
  determine if an incrementing symbol appears on the game grid as part of the determined outcome for the first game of chance;
  receive a second signal to initiate a second game of chance after any first awards are provided based on the determined outcome of the first game of chance, the second game of chance initiated in response to placement of a second wager, the second wager decreasing the credit balance from the third credit balance amount to a fourth credit balance amount, where the second game of chance is independent of the first game of chance;
  when it is determined that an incrementing symbol appears on the game grid in the first game of chance and a second game of chance has been initiated:
   increment the incrementing symbol by copying the incrementing symbol and replacing a symbol in an adjacent symbol position with a first copy of the incrementing symbol, and
lock the incrementing symbol and the first copy of the incrementing symbol in their respective symbol positions on the game grid during the second game of chance;

determine an outcome for the second game of chance by maintaining the positions of the locked symbols on the game grid and randomly determining symbols to be displayed in non-locked symbol positions of the game grid;

display the determined outcome for the second game of chance on the game display by spinning the plurality of reels while maintaining the positions of the locked symbols on the game grid, and stopping the plurality of game reels to show the determined outcome for the second game of chance in the symbol positions of the game grid;

provide any second awards for symbol combinations based on the determined outcome of the second game of chance, where the provided second awards increase the credit balance from the fourth credit balance amount to a fifth credit balance amount;

receive a third signal to initiate a third game of chance after any second awards are provided based on the determined outcome of the second game of chance, the third game of chance initiated in response to placement of a third wager, the third wager decreasing the credit balance from the fifth credit balance amount to a sixth credit balance amount, where the third game of chance is independent of the first game of chance and independent of the second game of chance;

after the third game of chance has been initiated:
increment the incrementing symbol by copying the incrementing symbol and replacing a symbol in a symbol position adjacent to the incrementing symbol or adjacent with the first copy of the incrementing symbol with a second copy of the incrementing symbol, and
lock the incrementing symbol, the first copy of the incrementing symbol, and the second copy of the incrementing symbol in their respective symbol positions on the game grid during the third game of chance;

determine an outcome for the third game of chance by maintaining the positions of the locked symbols on the game grid and randomly determining symbols to be displayed in non-locked symbol positions of the game grid;

display the determined outcome for the third game of chance on the game display by spinning the plurality of reels while maintaining the positions of the locked symbols on the game grid, and stopping the plurality of game reels to show the determined outcome for the third game of chance in the symbol positions of the game grid; and provide any third awards for symbol combinations based on the determined outcome of the third game of chance, where the provided third awards increase the credit balance from the sixth credit balance amount to a seventh credit balance amount.

16. The gaming device of claim 15, wherein the incrementing symbol is incremented by copying the incrementing symbol to a symbol position vertically adjacent to the symbol position of the incrementing symbol.

17. The gaming device of claim 15, wherein the incrementing symbol includes a directional indicator.

18. The gaming device of claim 17, wherein the incrementing symbol is incremented by copying the incrementing symbol to a symbol position adjacent to the symbol position of the incrementing symbol in the direction indicated by the direction indicator associated with the incrementing symbol.

\* \* \* \* \*